No. 841,322. PATENTED JAN. 15, 1907.
E. HOXIE.
THROTTLE VALVE.
APPLICATION FILED JUNE 13, 1904.
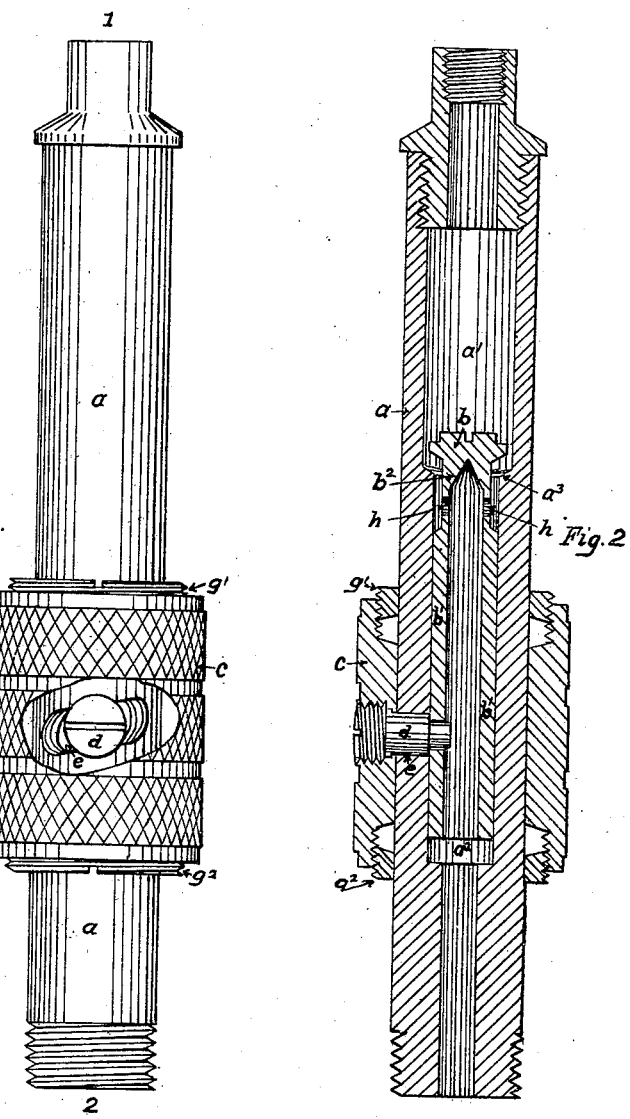

UNITED STATES PATENT OFFICE.

EDMUND HOXIE, OF EVERETT, MASSACHUSETTS.

THROTTLE-VALVE.

No. 841,322.     Specification of Letters Patent.     Patented Jan. 15, 1907.

Application filed June 13, 1904. Serial No. 212,291.

*To all whom it may concern:*

Be it known that I, EDMUND HOXIE, of Everett, in the county of Middlesex and State of Massachusetts, have invented certain new and useful Improvements in Throttle-Valves, of which the following is a specification.

This invention relates to throttle-valves for pneumatic tools and for any other purpose for which stop-valves may be used, in which the rotation of a sleeve on the outside of a tube opens and closes a valve on the inside, the object being to provide improved mechanism for controlling the supply to tools and to afford facilities for the proper adjustment and repair of the parts, and also to afford facilities for readily stopping leakage after the component parts shall become worn.

In the accompanying drawings, forming part of this specification, Figure 1 represents a view of the completed invention with a part of the outer sleeve cut away to show the diagonal slot in the enclosed tube. Fig. 2 is a sectional view on line 12 of Fig. 1.

The same letters of reference indicate the same parts in each figure.

The invention consists of a tube $a$, having two internal diameters $a'$ $a^2$ with the valve-seat $a^3$ on the shoulder where the two diameters meet, the valve $b$, having a guide $b'$ inside the tube $a^2$, a sleeve $c$ with fibrous packing $ff$ in the counterbored ends, loosely mounted on the outside of the tube $a$, connecting with and operating the valve $b$ by means of a pin $d$, rigidly connected to and made integral with the sleeve $c$, extending inwardly through a diagonal slot $e$, cut through the wall of the tube $a$ and connecting with the valve-guide $b'$. By the interposition of the diagonal slot $e$ in the tube $a$ inclosing the pin $d$ that forms the connection between the sleeve $c$ and the valve $b$ through $b'$ the rotating of the sleeve $c$ in one direction opens and in the opposite direction closes the valve.

It will readily be seen that the connection of the pin $d$ with the valve-guide $b'$ through the diagonal slot in the wall of the tube $a$ to the sleeve $c$ must be so loose as to offer little or no resistance to the escape of whatever may be under pressure inside the tube, and to provide against leakage both ends of the sleeve $c$ are counterbored, threaded, and provided with packing-glands $g'$ $g^2$, so that by inserting any approved packing leakage is prevented, while the sleeve $c$ is free to rotate about the tube $a$ as far as the pin through slot $e$ in tube $a$ will permit.

It will be noted that the guide $b'$ for the valve $b$ consists of a cylinder hollow for a sufficient part of its length to meet holes $h\ h$, drilled through the neck $b^2$ of the valve $b$; but this is not an essential form of guide, others of well-known form being equally adaptable, and I do not by showing one form debar myself from any other that may be available.

What I do claim as my invention, and desire to secure by Letters Patent, is—

1. The combination of a valve adapted to open or close by a combined rotary and longitudinal motion in an inclosing tube, a diagonal slot in said tube; a loosely-fitting sleeve outside of said tube, the ends of said sleeve packed against pressure from the inside, and a pin rigidly secured to said sleeve, passing through the diagonal slot in said tube, to a connection with said valve, so that said valve and sleeve will have a combined rotary and longitudinal motion, substantially as described.

2. The combination of a sleeve, loosely mounted upon a tube containing a valve, said sleeve having packing-glands at the ends, and packing between the said sleeve and tube, with a diagonal slot in said tube and a pin rigidly secured to said sleeve and extending through the diagonal slot in the said tube, to a connection with the said valve, said valve to open and close by a combined rotary and longitudinal motion of said sleeve, substantially as described.

3. The combination of a tube, having a different inside diameter at each end, a valve-seat at the shoulder, formed by the meeting of said two different diameters, and a diagonal slot in the side of said tube; with a loosely-fitting sleeve outside of said tube, provided with packing-glands and packing, at its ends, and a rigidly-connected pin extending through said slot in tube, forming a connection with a suitable valve seated inside of said tube, to operate said valve, by a combined rotary and longitudinal motion, substantially as described.

In testimony whereof I have signed my name to this specification in the presence of two subscribing witnesses.

EDMUND HOXIE.

Witnesses:
PERLEY P. BOSTWICK,
CHARLES F. ANDREWS.